March 13, 1945. G. J. WOREL 2,371,570
APPARATUS FOR RECONDITIONING BALL RACES ON
AUTOMOTIVE DISTRIBUTORS AND THE LIKE
Filed Feb. 28, 1944
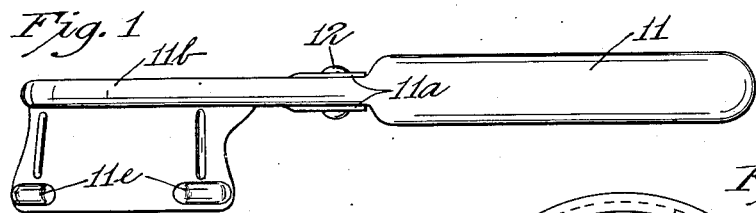
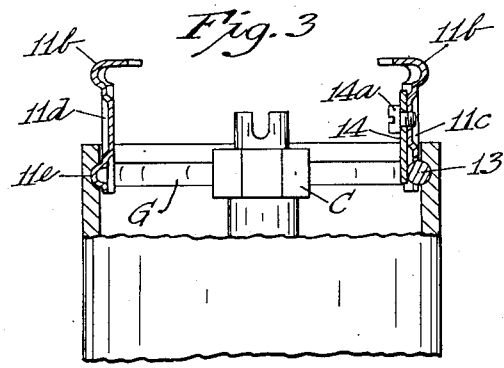
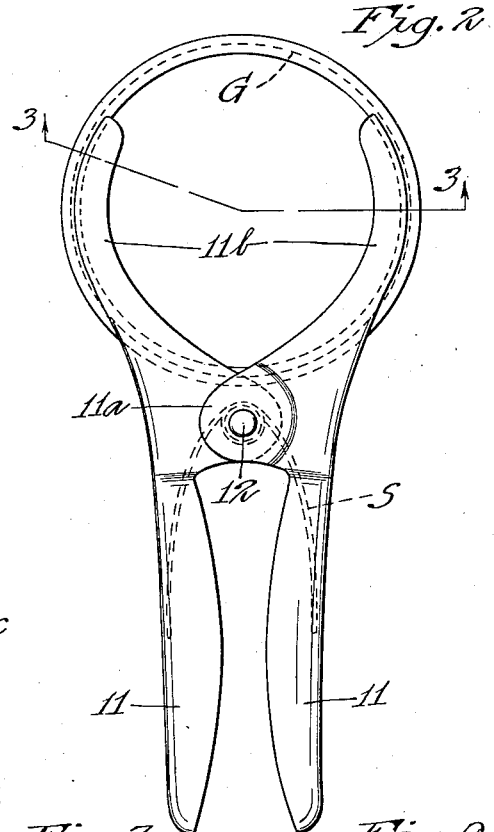
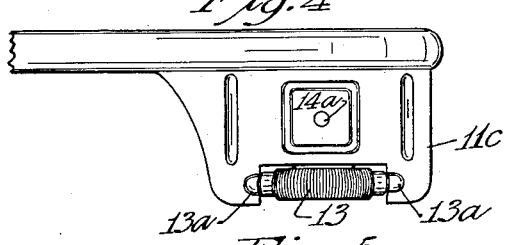
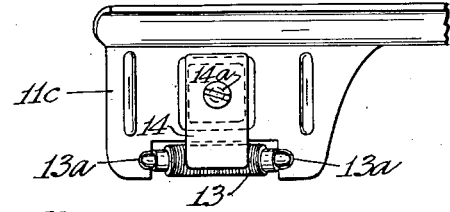
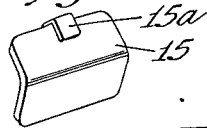
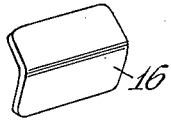
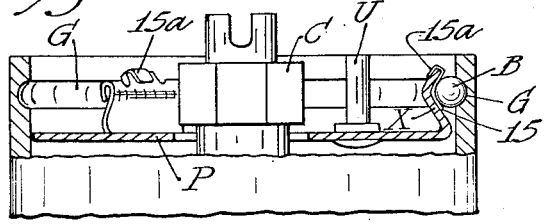
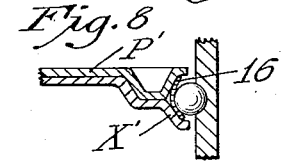
Inventor
Glen J. Worel
By Williamson & Williamson
Attorneys Patented Mar. 13, 1945

2,371,570

UNITED STATES PATENT OFFICE 2,371,570

APPARATUS FOR RECONDITIONING BALL RACES ON AUTOMOTIVE DISTRIBUTORS AND THE LIKE

Glen J. Worel, Minneapolis, Minn., assignor to Thexton Manufacturing Company, Minneapolis, Minn., a corporation of Minnesota Application February 28, 1944, Serial No. 524,244

5 Claims. (Cl. 29—76)

This invention relates to the re-conditioning of ball races and associated ball-retaining pockets in automotive distributors and the like and has particular application to a method and apparatus for economically and easily re-grooving the internal ball race and re-lining the ball-retaining pockets of automotive distributors of the vacuum actuated type although my invention is applicable for re-conditioning internal ball races in many other devices and mechanisms.

In continued use of automotive distributors, particularly of the vacuum actuated type, the vibration of the motor in operation causes the balls retained by the pockets in the distributor plate to wear indentations in the internal ball groove of the case or head of the distributor. In operation, as the plate is moved by vacuum, the balls are moved in and out of said indentations, varying the gap between the breaker points of the distributor so that it becomes impossible to hold the uniform cam angle on each of the grooves or points of the cam thereby causing "skips" in the performance of the motor.

It is an object of my invention to provide simple, inexpensive apparatus for re-conditioning the ball race without requiring replacement of the actual balls utilized and without requiring the distributor to be taken apart or completely dismantled.

A further object is the provision of a simple, but highly efficient re-grooving tool which may be quickly and accurately applied to the internal groove in the head of the distributor case by simple removal of the distributor plate and which through a spreading and oscillatory action, will perfectly adjust itself and accurately re-cut the worn portions of the ball groove to remove indentations and irregularities.

A further object is the provision of complete apparatus for re-conditioning the bearing relation between the distributor plate and case of an automotive distributor including simple apparatus for re-lining and providing a new and accurate bearing surface for the several ball-retaining pockets in the distributor plate and which also makes provision for compensation, if desired, for the re-grooving process of the ball groove, enabling the same ball bearings to be utilized without adjustment of one or more of the ball-retaining pockets.

A still further object is the provision of a simple and efficient method for re-conditioning the ball race including both internal groove and ball-retaining pockets for automotive distributors particularly of the vacuum actuated type which may be carried out accurately and quickly without taking the distributor apart.

These and other objects and advantages of my invention will be more apparent from the following description made in connection with the accompanying drawing, wherein like reference characters refer to the same parts throughout the several views, and in which —

Figure 1 is a side elevation showing a preferred form of my re-grooving tool;

Figure 2 is a top plan view of the same as applied in use;

Figure 3 is a vertical section taken on the line 3—3 of Figure 2, showing the circular tooth cutter and one of the guides of my re-grooving tool applied in the internal ball groove at the upper portion of a distributor case;

Figure 4 is a fragmentary elevation showing the side of my re-grooving tool opposite to that shown in Figure 1;

Figure 5 is a fragmentary inner side elevation of the cutter-carrying sector of my re-grooving tool;

Figure 6 is a view mostly in vertical section showing the upper portion of an automotive distributor with the distributor cap, breaker arm and contacts removed and showing one type of my improved re-liner applied to two of the ball-retaining pockets;

Figure 7 is a detail perspective view showing one of said re-liners detached;

Figure 8 is a fragmentary vertical section showing a portion of a distributor plate with one of its ball-retaining pockets and showing another type of re-liner applied thereto; and Figure 9 is a detail perspective view showing the type of re-liner applied in Figure 8 as it appears detached.

Figure 6 of the drawing illustrates the upper portion of a conventional type of vacuum operated automotive distributor with the distributor cap and several of the working parts removed. The breaker arms and contacts are not shown. The rotary cam C is of conventional type having cam lobes and a typical installation of the distributor plate P is illustrated mounted within the upper portion of the distributor shell and surrounding the cam and its shaft. The distributor plate P is provided with three triangularly arranged upstanding ball-retaining pockets X, two of which may be integrally constructed from the plate P and one of which is preferably constructed of resilient material to automatically give some adjustment or take up for wear. The two integrally formed ball-retaining pockets are of such material that they may be bent outwardly slightly to provide additional adjustment for wear. Balls B are retained by the several pockets X and work in an interior groove G forming part of the ball race, said groove being formed in the inner peripheral wall of the distributor case adjacent the upper open end thereof. The upstanding pivot pin for the breaker arm is indicated by the letter U.

I provide a simple and accurate tool for re-grooving the internal groove G of the ball race, this tool comprising a pair of spreading pliers, as shown, in Figures 1 to 5, having elongated spaced handles 11, the outer ends of which are pivoted together by a pivot pin 12 which as shown extends through overlapping ears 11a formed on the opposing medial portion of the plier members outwardly of the handles, said pivot pin lying in a plane perpendicular to the plane defined by the longitudinal center lines of the two handles 11.

A U-shaped wire spring S has its medial portion wound about the pivot pin 12 and has its free arms abutted against the inner sides of the handles 11 to urge the handles apart.

The members of the pliers are not crossed but extend in spaced relationship with their outer or working ends 11b curved inwardly in converging relationship, said working ends having depending sector plates 11c and 11d respectively which are of substantially arcuate shape conforming, when the tool is spread, to the interior cylindrical contour of the average sized distributor case. The sector plate 11c adjacent its lower edge has detachably mounted thereon an arcuately shaped circular tooth cutting element 13, which is disposed circumferentially of the sector plate with its concavely extending portion disposed outwardly of the plate and with the diameter of the element being such as to nicely fit the internal ball race groove G of the distributor case. Any suitable means may be provided for detachably retaining the cutter element 13 which, as shown, comprises a pair of spaced sockets 13a formed in the vertical edges of a slotted portion of the sector 11c which receives the tool in cooperation with a straight retaining plate 14 which is fixed to the inner concave surface of sector plate 11c by means of a suitable screw 14a, the lower end of said plate clamping against the medial portion of the cutter element to retain the same in its sockets as clearly shown in Figures 3 and 5. The said retaining sockets 13a receive the diminished extremities of the cutter element.

The sector plate 11d on the other working end of the spreading re-grooving tool is provided, as shown with a plurality of circumferentially spaced guiding beads 11e which may be pressed out or otherwise formed on the outer convex surface thereof, said beads being of the proper diameter to engage the internal ball race groove G and having their center lines disposed in a common horizontal plane with the longitudinal center line of the cutter element 13.

My apparatus for re-conditioning the said ball races also may include small liner members 15 for application to the worn ball-retaining pockets X. In Figure 7 one form of such a liner is illustrated for use on the type of distributor plate P shown in Figure 6. The liner 15 is angularly bent, as shown, to closely conform in shape to the ball-retaining pocket and has at its upper edge an outer and downwardly extending clip 15a which is adapted to engage and be retained upon the upper edge of the upstanding element which defines the ball pocket X. With the use of such liners in the ball-retaining pockets not only is a new, smooth, unpitted bearing surface provided for the ball-retaining pockets, but furthermore the liners 15 may be made of a thickness to compensate for excessive material removed in re-grinding the internal ball race groove G.

In Figure 8 a portion of a somewhat different type of distributor plate P' is shown having ball-retaining pockets X formed by the cooperation of two discs or plates with cooperating flanges formed in the outer peripheral portions thereof. In relining such a ball pocket a liner 16 of the type illustrated in Figure 9 is utilized being generally similar in shape to the reliner shown in Figure 7, but having no clip utilized for retention purposes.

In using my apparatus for re-conditioning the ball races of automotive, vacuum-operated distributors and, the like, the distributor does not need to be dismantled or removed from the motor. It is only necessary to remove the ball bearings B through the slotted portions provided in the distributor case and then lift out the distributor plate P with the mechanism including the breaker arm, contacts, condenser or other elements attached thereto.

With the distributor plate and, of course, the cap of the distributor removed, as shown in Figure 3, my re-grooving tool is applied as illustrated with the sector plates 11c and 11d depending and positioned to cause the cutter element 13 and the circumferentially spaced guide beads 11e to be engaged in the internal ball race groove G. The working arms of the tool are then spread by gripping the handle members 11 together and when so gripped, the tool is oscillated, being perfectly centered relative to the annular groove by the arrangement and circumferential spacing of the elements 11e with the cutter element 13. The oscillatory movement cuts and smooths the internal surface of the groove G removing all indentations, pits and irregular surfaces. It is only necessary to, of course, re-groove the portions of the areas which are opposed to the ball-retaining pockets X.

In the oscillatory re-grooving action of the tool the U-shaped spring S, which constantly urges the working arms of the tool inwardly, acts in conjunction with the handle pressure applied to handle members 11 as an equalizer or shock absorber, causing the cutter element to remove irregularities in the portion of the groove treated and eliminating any slight chattering or vibrative effect upon the cutter during operation of my tool.

The centering and proper action of my re-grooving tool is not dependent upon oscillation of the cutter elements upon a shaft or central axis disposed axially of the distributor case, but is dependent only upon the spreading-action engagement of the triangularly arranged elements of the two spreader arms in their working relationship with the actual internal groove G. Thus a very efficient and accurate re-grooving is obtained with little effort and without dismantling of the distributor.

In re-conditioning the ball races it will, of course, be understood that the previously used ball bearings may be utilized since very little wear occurs thereon. It will also be understood that if necessary to compensate for the slight amount of material removed from the groove G by my re-grooving tool, an adjustment may be made on one of the integral ball-retaining pockets by bending the same slightly outwardly.

With my re-grooving tool the worn areas of the ball race groove may be individually re-grooved as required without cutting from the entire groove or from one or more of the worn areas an excess of material. In other words, the portion of the groove opposed to one of the ball-retaining pockets may be worn and usually is worn more irregularly than the others. With my tool that particular portion of the groove requires more cutting but the portions opposite the other ball-receiving pockets usually require only light re-grooving. Thus a groove may be serviced or re-ground several times to perfectly re-condition the same with the removal each time of only the minimum amount of material necessary to properly re-condition the distributor for accuracy.

However, where greater accuracy is desired and particularly if the ball-retaining pockets have become badly worn or pitted, I prefer to apply the liner elements 15 or 16, as the case may be, such liners being inserted with the ball when the distributor plate is replaced. The liners when so used not only provide new and smooth bearing surfaces for reception of the balls, but they furthermore act as spacing shims to compensate for the material removed in re-grooving the internal groove G of the ball race.

The re-conditioning of the complete ball race, including the grooves and ball-retaining pockets, through the use of my apparatus provides a very simplified but practical and economical method which consists essentially in first re-grooving at least the areas of the internal ball race which have become irregularly worn and then re-lining the ball-retaining pockets in the distributor plate to provide smooth bearing walls and to in addition compensate in thickness for the material of the internal groove removed in the re-grooving step.

It will, of course, be understood that various changes may be made in the form, details, arrangements and proportions of the parts without departing from the scope of my invention.

What I claim is:

1. A re-grooving tool for internal, ball-race grooves, comprising a pair of spreading pliers having opposed spreading arms, said arms having depending portions extending substantially normal to a plane defined by the longitudinal center lines of said arms, one of said depending portions having externally mounted thereon an arcuate re-grooving element and the other of said depending portion carrying circumferentially extending guiding means adapted to fit the internal groove of the ball race, the center line of said guiding means being disposed in a common plane with the center line of said re-grooving element.

2. The structure set forth in claim 1, wherein said guiding means comprises a pair of arcuately circumferentially spaced beads.

3. The structure set forth in claim 1, and means for detachably securing said re-grooving element to said first mentioned depending portion.

4. A re-grooving tool for internal, ball-race grooves such as are employed in vacuum-operated automotive distributors, comprising a pair of spreading pliers having opposed spreading arms, said arms having depending sector portions which extend substantially normal to a plane defined by the longitudinal center lines of said arms, one of said sector portions having externally mounted thereon and circumferentially arranged, an arcuate circular tooth cutter of a size to fit a ball race groove, said other sector portion carrying circumferentially extending guiding means also adapted to fit said groove, the center line of said guiding means being disposed in a common plane with the center line of said cutter.

5. The structure set forth in claim 4, and resilient means for urging said opposed spreading arms together.

GLEN J. WOREL.